United States Patent
Kwatra et al.

(10) Patent No.: US 10,938,762 B2
(45) Date of Patent: Mar. 2, 2021

(54) METHODS AND SYSTEMS FOR MANAGING MULTIPLE RECIPIENT ELECTRONIC COMMUNICATIONS

(71) Applicant: INTERNATIONAL BUSINESS MACHINES CORPORATION, Armonk, NY (US)

(72) Inventors: Shikhar Kwatra, Durham, NC (US); Corville Allen, Morrisville, NC (US); Sushain Pandit, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/375,760

(22) Filed: Apr. 4, 2019

(65) Prior Publication Data
US 2020/0322299 A1    Oct. 8, 2020

(51) Int. Cl.
*H04L 12/58*    (2006.01)
*G06F 40/30*    (2020.01)
*H04L 29/08*    (2006.01)

(52) U.S. Cl.
CPC .............. *H04L 51/16* (2013.01); *G06F 40/30* (2020.01); *H04L 51/04* (2013.01); *H04L 67/22* (2013.01)

(58) Field of Classification Search
CPC ......... H04L 51/16; H04L 51/04; H04L 67/22; G06F 40/30
See application file for complete search history.

(56) References Cited

U.S. PATENT DOCUMENTS

| | | | |
|---|---|---|---|
| 2004/0001090 A1* | 1/2004 | Brown | G06Q 10/107 715/752 |
| 2010/0223581 A1 | 9/2010 | Manolescu | |
| 2013/0226852 A1* | 8/2013 | Brillhart | G06F 16/24578 706/46 |
| 2016/0124930 A1* | 5/2016 | Dhawan | G06F 40/197 715/224 |
| 2016/0294746 A1 | 10/2016 | Boothroyd | |
| 2017/0052949 A1* | 2/2017 | Baldwin | G06F 40/194 |
| 2018/0225279 A1 | 8/2018 | Cruz | |
| 2019/0370556 A1* | 12/2019 | Kline | G06K 9/6262 |
| 2020/0053035 A1* | 2/2020 | Mukherejee | G06F 40/40 |

* cited by examiner

*Primary Examiner* — Chris Parry
*Assistant Examiner* — Steven C Nguyen
(74) *Attorney, Agent, or Firm* — Griffiths & Seaton PLLC (57) ABSTRACT

Embodiments for managing electronic communications by one or more processors are described. A plurality of historical communications are analyzed. Each of the plurality of historical communications is associated with at least one of a plurality of recipients. Reactions of the plurality of recipients to each of the plurality of historical communications associated therewith are analyzed. The analysis of the reactions includes normalizing the reactions to determine a consensus of the reactions. A current communication associated with a sender and the plurality of recipients is analyzed. The current communication is modified based on the analyses of the plurality of historical communications, the reactions of the plurality of recipients, and the current communication. The modified current communication is caused to be transmitted to at least one of the sender and at least some of the plurality of recipients.

18 Claims, 5 Drawing Sheets

//METHODS AND SYSTEMS FOR MANAGING MULTIPLE RECIPIENT ELECTRONIC COMMUNICATIONS

BACKGROUND OF THE INVENTION

Field of the Invention

The present invention relates in general to computing systems, and more particularly, to various embodiments for managing communications with multiple recipients.

Description of the Related Art

Various forms of electronic communications or messaging, such as text messaging, emails, messaging applications, etc., may be set up in such a way that multiple users (or a group of users) can simultaneously take part in conversations or discussions. More specifically, such communication systems may be utilized in such a way that a sender may simultaneously send a communication (or message) to multiple recipients, who may then respond by sending a reply to the sender and/or the other recipients of the original communication.

In such a group communication session, the dynamics of the discussion/dialogue may become a situation in which "group-think" and/or group dynamics suggest that communications be adjusted to better fit the composition of the group. Learning and understanding how particular people within a group react to message or message types may facilitate better communication among friends, colleagues, and customers, and even in some cases, strangers.

The understanding, or lack thereof, of the types of messages that are well-received compares to those that are received in an indifferent, "lukewarm," or negative manner may have a significant impact on the effectiveness of the message(s), maintaining friendships, customers, etc., and whether or not the dialogue continues.

SUMMARY OF THE INVENTION

Various embodiments for managing electronic communications by one or more processors are described. In one embodiment, by way of example only, a method for managing electronic communications, again by one or more processors, is provided. A plurality of historical communications are analyzed. Each of the plurality of historical communications is associated with at least one of a plurality of recipients. Reactions of the plurality of recipients to each of the plurality of historical communications associated therewith are analyzed. The analysis of the reactions includes normalizing the reactions to determine a consensus of the reactions. A current communication associated with a sender and the plurality of recipients is analyzed. The current communication is modified based on the analyses of the plurality of historical communications, the reactions of the plurality of recipients, and the current communication. The modified current communication is caused to be transmitted to at least one of the sender and at least some of the plurality of recipients.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, various forms of electronic communications or messaging, such as text messaging, emails, messaging applications, etc., may be set up in such a way that multiple users (or a group of users) can simultaneously take part in conversations or discussions. More specifically, such communication systems may be utilized in such a way that a sender may simultaneously send a communication (or message) to multiple recipients, who may then respond by sending a reply to the sender and/or the other recipients of the original communication.

In such a group communication session, the dynamics of the discussion/dialogue may become a situation in which "group-think" and/or group dynamics suggest that communications be adjusted to better fit the composition of the group. Learning and understanding how particular people within a group react to message or message types may facilitate better communication among friends, colleagues, and customers, and even in some cases, strangers.

The understanding, or lack thereof, of the types of messages that are well-received compares to those that are received in an indifferent, "lukewarm," or negative manner may have a significant impact on the effectiveness of the message(s), maintaining friendships, customers, etc., and whether or not the dialogue continues.

For example, consider a multiple user group chat (or texting) scenario. If one of the users (i.e., the sender) sends a message to the other users (i.e., the recipients) that includes content that one (or more) of the recipients considers offensive, insensitive, inappropriate, etc., the likelihood of that user continues to participate in the discussion may be reduced. In some situations, such an occurrence may even negatively effect a relationship (e.g., a business relationship, friendship, etc.) outside of the group chat (i.e., in the "real world").

However, in a group chat environment, the dynamics may change slightly due to, for example, group-think, one or more of the recipients not wanting to disrupt the flow or mood of the discussion, and/or one or more the recipient simply not wanting to voice their reaction. Detecting such situations and having a mechanism with which to manage them is one of the issues addressed by the embodiments described herein.

In view of the foregoing, a need exists for methods and systems that allow for electronic communications or messages, such as those sent via text messaging, messaging applications, emails, etc., to be essentially filtered or modified such that the likelihood that any of the recipients reacts in a relatively negative manner is reduced.

To address these needs, embodiments described herein provide methods and systems that, for example, learn and/or take into account the reaction(s) of user(s) to (previous or historical) communications. When a new (or current or subsequent) communication is detected (e.g., while being composed, after being composed but before being transmitted, etc.), the system may utilize the previous reactions of the users (i.e., the recipients) to perform an ameliorative action to, for example, reduce the likelihood that any of the recipients reacts negatively to the communication.

In some embodiments, the methods and system described herein analyze previous (or historical) communications and reactions of users (or recipients) to the previous communications to determine correlations therebetween (e.g., via a cognitive analysis). When a subsequent (or current) communication is detected, a similar analysis may be performed on the communication and/or intended recipients to predict or estimate the reactions of the recipients. If any of the recipients are predicted to have a relatively negative reaction to the communication, an ameliorative action may be taken, such as modifying the communication (e.g., with respect to content and/or recipient list) and/or providing a notification (or warning) to the sender regarding sending the communication to particular recipients.

In some embodiments, the reactions of users to previous communications (or messages or types of messages) are gathered, monitored, and/or collected. When a subsequent or current communication is detected, such as in a group communication session, the group's collective predicted response is categorized, along with any anomalies in the group (e.g., predicted reactions of particular recipients that differ from the predicted reactions of other recipients). If such an anomaly is detected, the current communication may be modified. The modification(s) to the current communication may include modifying the content of the communication (e.g., changing or deleting text), changing the recipients to which the communication is sent (e.g., preventing the communication from being sent to and/or being accessible by at least some of the originally intended recipients), and/or providing the sender with a warning (e.g., warning the sender about sending the communication to particular recipients, thus at least delaying the communication being sent to the recipients), such that the communication is more likely to resonate with all of the recipients and/or not offend any recipients.

The analysis of the reactions of the recipients (or users) to previous/historical communications may utilize, for example, sentiment, tone, non-reactions, group anomaly messages, and emoticon-based reactions to categorize the group response based on message or message type. In addition, in some embodiments, a normalization of the anomaly (and/or of the reactions) is performed across the group to better identify consensus.

For example, in a multi-user group chat scenario (e.g., via text messaging, email chain, etc.), based on a specific recipient's (predicted) reluctance to respond to a certain message (e.g., as determined based on the recipient's reactions to previous communications and/or other data sources associated with the recipient), the content of the sender's message (or a current communication) may be modified (e.g., one or more words may be changed, automatically or after such an option is provided to the sender) before the message is made accessible to the recipient(s) (e.g., before the message is transmitted). In some embodiments, the sender may (also) be prompted with a warning regarding to potential negative reaction of one or more of the recipients. As another example, the message may be sent to only selected ones of the original/intended recipients (e.g., automatically or after such an option is provided to the sender). For instance, if the sender is sending a message (e.g., that includes humor) that may be considered offensive by particular recipients, the system may warn the sender not to send this type of message to those recipients, modify the message, and/or cause the message to not be sent to those recipients (i.e., those recipients may be blocked). In some embodiments, the warning provided to the sender and/or the modified version of the sender's original message (e.g., with respect to content and/or list of recipients) may be considered to be a modified current communication (i.e., a modified version of the sender's current communication).

As such, in some embodiments, the system learns the cognitive heuristics of the receiver(s) (or recipient(s)) with respect to, for example, their reactions to (previous/historical) communications or types of communications. This learning is applied to subsequent, new, or current communications to, for example, modify or filter the communications and/or prompt the sender with a warning (e.g., "Are you sure you want to send this particular message to User X? They did not like it the last time you sent a similar message.").

In some embodiments, the system may utilize written or visual reactions (or feedback) of the users (or recipients), such as reply or response communications (e.g., communications sent by the recipients in response to previous communications), such as text-based communications, emoticons, etc. and/or the lack of such a reply/response. Additionally, other types of data may be utilized to determine the reactions of the users, including data collected or detected by sensors, such as cameras (e.g., for facial/mood recognition), microphones (e.g., for detecting spoken responses), and biometric sensors (e.g., heart rate and/or blood pressure monitors), such as those on wearable technology devices (e.g., smart watches).

It should be noted that the embodiments described herein may be applied to not only text-based communications, such as text messages, emails, etc. but also audio and/or video communications, such as voicemail messages, video clips, etc. Additionally, the communications (or media or content) may be those associated with other online channels, such as social media platforms (e.g., social media posts shared with and/or accessible by multiple users).

In some embodiments, the management of electronic communications described herein is performed utilizing a cognitive analysis with respect to, for example, analyzing user reactions to communications, analyzing the contextual situation of the user(s), analyzing communications (e.g., previous communications and/or current/subsequent communications), and/or determining an ameliorative action. The cognitive analysis (or analyses) may utilize various data sources, including, for example, the reactions of users to previous communications (e.g., response communications) and/or the user's observed behavior after consuming (e.g., receiving, viewing, etc.) previous communications.

In some embodiments, a cognitive analysis may be used to generate a profile for the user(s) (e.g., associated with their reactions to communications and/or types of communications), associate communications (or types of communications) with the reactions of the user(s), and/or determine a score or grade for the (predicted) reaction of the user(s) to particular communications. Data sources that may be used to perform the cognitive analysis (or analyses) may include any appropriate data sources associated with the user that are accessible by the system (perhaps with the permission or authorization of the user). Examples of such data sources include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases.

The cognitive analysis may include classifying natural language, analyzing tone, and analyzing sentiment (e.g., scanning for keywords, key phrases, or otherwise performing natural language processing (NLP) techniques, etc.) with respect to, for example, the data sources associated with the user(s) and/or communications (e.g., emails, text messages, social media posts, etc). Over time, the methods and systems described herein may determine correlations (or insights) that allow for an improvement in the determining of the reaction(s) of user(s) to receiving (or consuming) particular communications (or types of communications), perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the reactions of recipients to communications or types of communications. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing electronic communications by one or more processors is provided. A plurality of historical communications are analyzed. Each of the plurality of historical communications is associated with at least one of a plurality of recipients. Reactions of the plurality of recipients to each of the plurality of historical communications associated therewith are analyzed. The analysis of the reactions includes normalizing the reactions to determine a consensus of the reactions. A current communication associated with a sender and the plurality of recipients is analyzed. The current communication is modified based on the analyses of the plurality of historical communications, the reactions of the plurality of recipients, and the current communication. The modified current communication is caused to be transmitted to at least one of the sender and at least some of the plurality of recipients.

The modifying of the current communication may be performed utilizing a cognitive analysis. Each of the current communication and the modified current communication may include at least one of an email and a text message.

The modifying of the current communication may include modifying content of the current communication. The modified current communication may include an indication of a warning regarding transmitting the current communication to the plurality of recipients. The causing of the modified current communication to be transmitted to at least one of the sender and at least some of the plurality of recipients may include causing the modified current communication to be transmitted to only the sender.

The modified current communication may be the same as the current communication. The causing of the modified current communication to be transmitted to at least one of the sender and at least some of the plurality of recipients may include causing the modified current communication to be transmitted to only selected ones of the plurality of recipients.

The reactions of the plurality of recipients to each of the plurality of historical communications associated therewith may include at least one of a response communication and reaction information detected by at least one sensor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
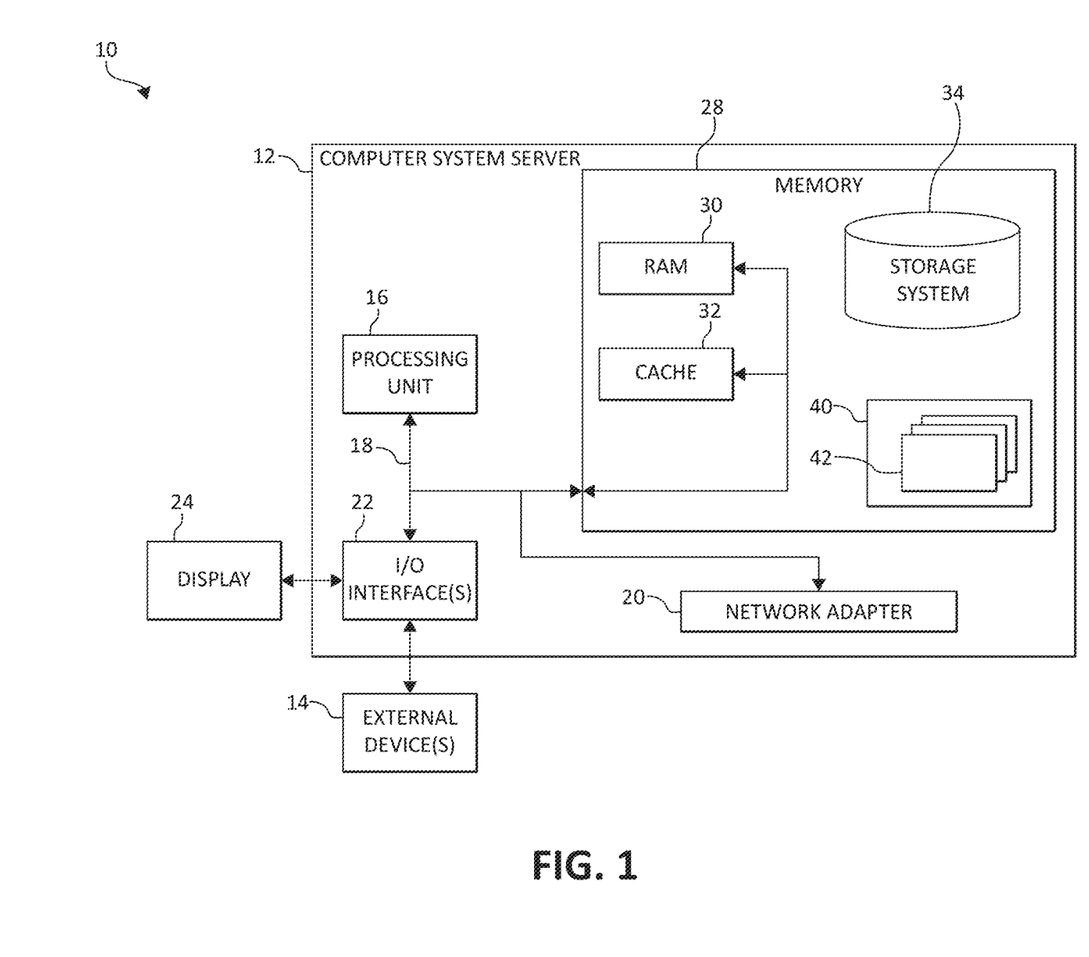
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of implementing and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, mobile electronic devices (e.g., mobile phones, personal data assistants (PDAs), laptop devices, etc.), network PCs, and servers. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
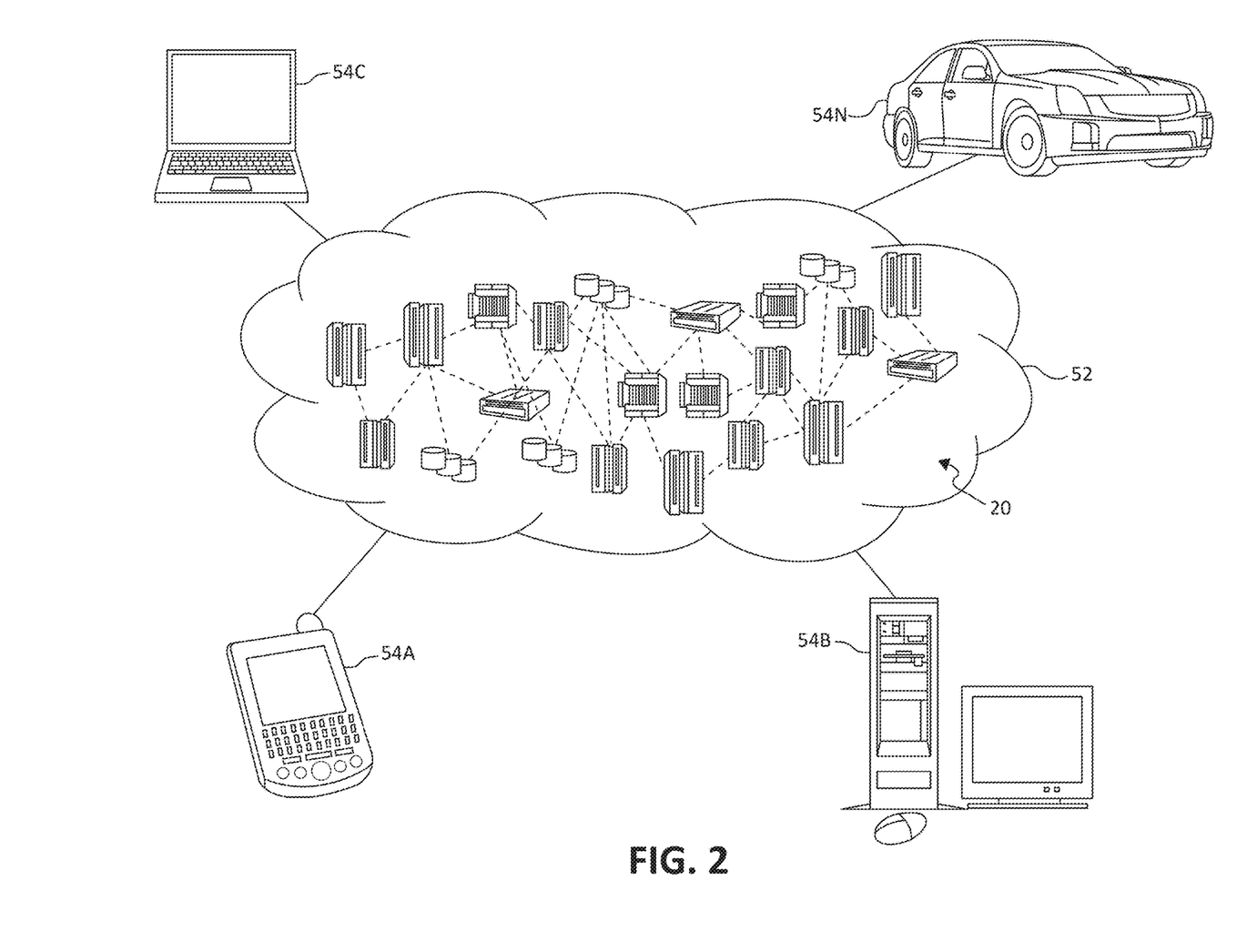
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, PDA or cellular telephone 54A, desktop computer 54B, laptop computer 54C, and/or automobile computer system 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
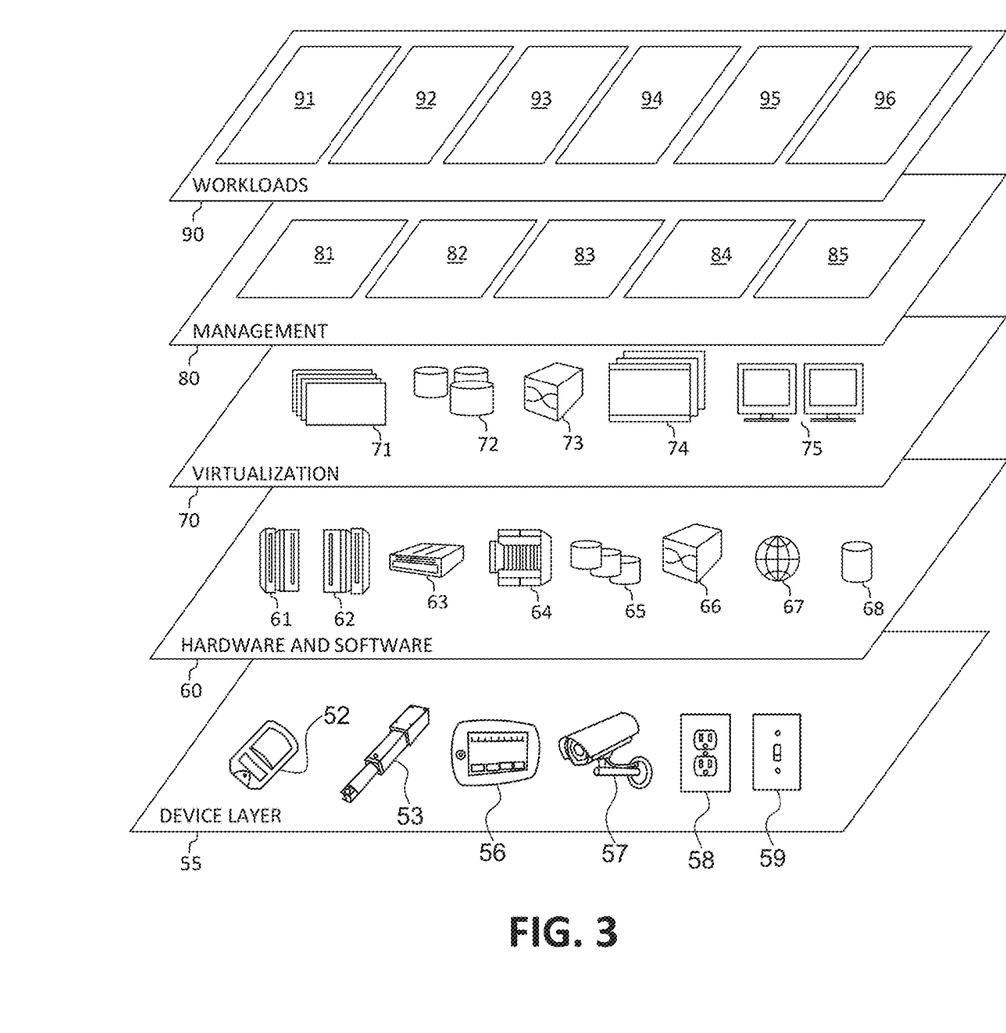
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing electronic communications as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing electronic communications, such as messages sent in text messaging, messaging applications, email, etc, sent in environments that include multiple (e.g., more than two) users (e.g., a multiple party communication group). In some embodiments, the reactions of users to (previous/historical) communications (or messages or types of messages) are gathered, monitored, and/or collected. When a subsequent (or current or new) communication is detected, such as in a group communication session, the group's collective predicted response is categorized, along with any anomalies in the group (e.g., predicted reactions of particular recipients that differ from the predicted reactions of other recipients). If such an anomaly is detected, the current communication may be modified. For example, the content of the current communication may be changed, the recipients to which the communication is sent may be changed, and/or the sender may be provided with a warning, such that the communication is more likely to resonate with all of the recipients and/or not offend any recipients.

In some embodiments, the system monitors (or detects) communications that are sent (or transmitted or made accessible) by a sender (or content creator) to at least one recipient (e.g., multiple recipients). The communication(s) (or message(s)) may be text-based (e.g., include alphanumeric characters and/or emoticons), such as an email, text message, or message sent via a messaging application, and/or include video and/or audio content (e.g., a recorded video and/or audio clip), such as a file "attached" to an email. In some embodiments, the methods and systems described herein may be other online communication channels, such as the posting or sharing of content to social media platforms (e.g., a social media post shared to and/or accessible by multiple users). The communication may be received and/or consumed (e.g., read, viewed, listened to, etc.) by the recipients (e.g., via an appropriate computing node).

In some embodiments, the reactions of the recipient(s) to consuming the communication(s) are monitored and analyzed and may be collected by a machine learning model (or cognitive module) utilized by the methods and systems described herein. The monitoring and/or analysis of the reactions may include, for example, the following: performing a sentiment analysis of (e.g., text-based) responses (e.g., reply communications sent by the recipients via the same or different channel utilized to send the initial communications); performing a tone analysis of the responses; analyzing emoticon responses; noting non-participation in the group chat/discussion (e.g., the recipient does not reply with a text-based response or emoticon); noting/tracking the composing of responses that are not transmitted/sent in the group communication (e.g., the recipient began to compose a response but did not send the reply communication and/or whether such occurred after positive/negative responses were sent by other recipients).

The collected data may be normalized to account for portions of the group reactions (or collective reactions of the recipients) that may not be reflective of a true consensus where each participant (i.e., recipient) acts/reacts independently (e.g., in situations in which some of the participants either consciously or unconsciously react partially by reacting negatively to another user's genuine communication). In some embodiments, the system assesses relationship proximity (or the strength of relationships) between the users (or participants or recipients) by, for example, analyzing social graphs, comment history, post history, etc. (e.g., related to social media platforms), if such information is available/accessible. The system may also assess relationship proximity by tracking participation in (or on) common online channels (e.g., discussion forums, social media groups, etc.). For example, the system may track how often a first user (e.g., User A) takes part (e.g., creates a post/thread and/or comments on such) when a second user (e.g., User B) does (and/or vice versa), especially when their sentiment is determined to be similar or where one defends (e.g., sides with, agrees with, etc.) the other (or vice versa).

Based on this analysis, the system may normalize a vector formed from the collected/monitor reaction data for training the learning model. In some embodiments, additional/normalizing features may be added to the vector passed to the machine learning model (described below) that represents equalizing consensus (e.g., adding one artificial neutral sentiment/vote if there are four negative sentiments/downvotes by four participants who seem to not be acting 100% mutually independently). In some embodiments, scores may be (potentially) downgraded in situations in which participants are suspected (or determined) to be not acting in a mutually independent manner (i.e., not giving an objective feedback/reactions).

In some embodiments, communication (or message) content features are extracted (and/or analyzed) via, for example, NLP, sentiment analysis, and tone analysis to extract keywords and understand the contextual meaning and type of the communication(s). The inputs corresponding to types of texts in content analysis may include, for example, the following: written text (e.g., books and papers); oral text (e.g., speech and theatrical performance); iconic text (e.g., drawings, paintings, and icons); audiovisual text (e.g., television programs, movies, and videos); hypertexts (e.g., texts found in online sources).

A conceptual content analysis technique may be used to classify the content into different categories (e.g., generic, adult content, philosophy, cultural, etc). In some embodiments, k-means clustering, as is commonly understood, is used as a part of content analysis to semantically cluster the content into respective categories based on content type.

It should be noted that at least some aspects of the analysis and categorization of communications described above may be performed on (and/or refer to) previous/historical communications (i.e., those utilized to determine/predict a recipient's reaction to a new/subsequent communication) and new/subsequent/current communications (i.e., those for which the system is predicting the reactions of recipients).

In some embodiments, the system utilizes a deep stack neural network learning mechanism, which takes into account output features from multiple classifiers. For example, the output from the response analysis (e.g., output corresponding to the different responses/reactions of the different recipients, as described above) may be utilized. In some embodiments, principle component analysis may be performed for dimensionality reduction of the group's respective responses to communications. A normalized output corresponding to the anomaly equalizer, as described above, may (also) be utilized. Additionally, correlation output (e.g., classification of communications with respect to the recipient's profile and/or relationships with other users, as described above) may be utilized.

Reconfigurable weights may be applied on the grouping or cluster of recipients as part of the correlation output in order to determine the ameliorative action strategy, which may be taken as part of the output of the deep stacked neural network algorithm. The system may start with a single hidden layer or more depending on the width of additional features added as part of the anomaly equalizing (or normalization) feature set described above. Additional layers may be utilized to prevent overfitting, as is commonly understood, in view of a large overall feature set.

In some embodiments, the ameliorative actions (or strategies) may include, for example, modifying the communication, by for example, modifying at least some of the content (e.g., text) of the communication, selectively transmitting the communication to only particular recipients, and/or providing the sender with a notification or warning regarding sending the communication to particular recipients. For example, the communication may be modified by changing at least portions (e.g., words) thereof (e.g., in such a way to reduce the likelihood that any of the recipients and/or recipients to whom the communication is transmitted will react negatively). In some embodiments, the communication is only sent to those of the recipients (and/or caused to be rendered by computing nodes associated with those recipients) that are determined or estimated to react to the communication in a nonnegative (or relatively positive) manner (e.g., the communication was initially composed to be transmitted to four recipients, but the system only actually transmits the communication to two of them). Also, the system may provide the sender with a notification (e.g., via a pop-up window or other electronic message) that includes a warning regarding sending the communication to at least of the initial/original recipients and/or provides the user with an option regarding another ameliorative action (e.g., changing the communication and/or changing the list of recipients, as described above).

In embodiments in which the communication includes audio content, the message content (or speech input) may be extracted by capturing the waveform of the audio file in time slices, which are then separated into sound blocks. Each sound block may be segregated into soundlets. The soundlet contours may be analyzed into features, which may then be grouped into sets. The feature sets may then be concatenated into alphabet (or alphanumeric) forms, which may then be grouped into words. The words may be compared with dictionaries and/or various databases (e.g., online) to gain an understanding of the meaning and/or potential cultural uses. Identified speech strings may be concatenated into speech strings (or spoken text) and displayed. After such a process is performed, the communication may be processed or analyzed in a manner similar to that described above.

As such, in some embodiments, the methods and system described herein may analyze previous or historical communications and reactions of users (or recipients) to determine correlations therebetween (e.g., via a cognitive analysis). When a subsequent or current communication is detected, a similar analysis may be performed on the communication and/or intended recipients to predict or estimate the reactions of the recipients. If any of the recipients are predicted to have a relatively negative reaction to the communication, an ameliorative action may be taken, such as modifying the communication content and/or recipient list and/or providing a notification (or warning) to the sender regarding sending the communication to particular recipients.

Figure 4:
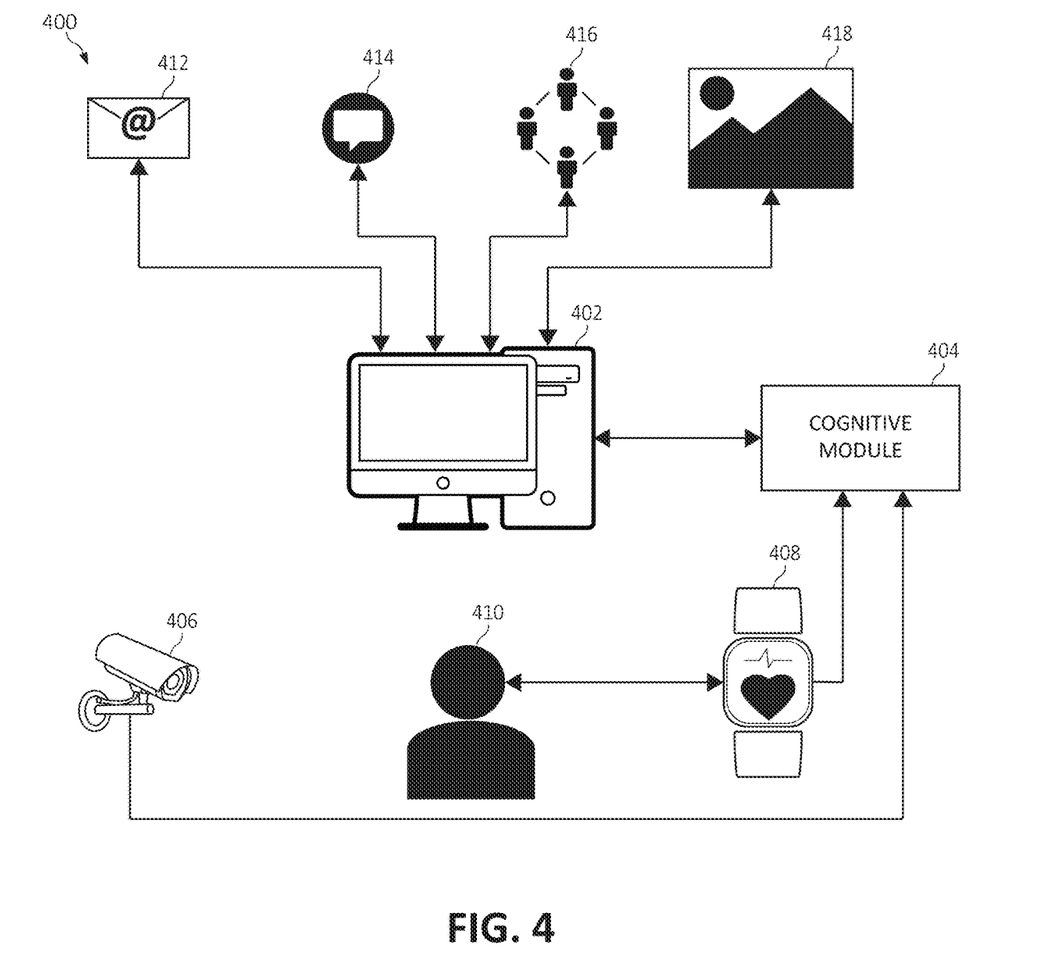
FIG. 4 is a block diagram of a computing environment according to an embodiment of the present invention.

FIG. 4 illustrates an exemplary computing environment 400 according to some embodiments of the present invention. The computing environment 400 includes a computing device 402, a cognitive module 404, at least one sensor 406, and a wearable device 408. The computing device (or node) 402 may be any suitable computing device through which a user 410 may receive (and/or consume) and/or send (and/or compose/generate) communications (or content), such as emails 412, text messages 414, social media posts/activity 416, and images 418. In the depicted embodiment, the computing device 402 is a desktop PC. However, in other embodiments, the computing device 402 may be (or include) other devices, such as laptop computers, mobile phones, tablet devices, etc. Also, as described above, although only one computing device 402 is shown in FIG. 4, in some embodiments, the methods and system described herein may be applied to computing environments in which the user(s) 410 utilizes multiple devices (e.g., a desktop PC and a laptop computer).

The cognitive module (or control system) 404 may include (and/or be implemented with) any suitable computing device or system, such as those described above, and may be configured to perform the management of electronic communications or content and/or any associated cognitive analysis, as described herein. The cognitive module 404 may be in operable communication with the computing device 402 (and/or content, applications, channels, etc. utilized by the computing device 402), the sensor 406, and the wearable device 408. Although the cognitive module 404 is shown as a separate component in FIG. 4, it should be understood that in some embodiments the cognitive module 404 may be integrated into another computing device (e.g., the computing device 402 or a remote device/server).

The sensor 406 may include any suitable sensor that is capable of monitoring the user 410, as described above. In some embodiments, the sensor 406 includes a camera and/or a microphone. The wearable device 408 may be any suitable wearable technology device, such as a smart watch, that may be utilized to perform additional monitoring of the user 410. For example, the wearable device 408 may include, for example, a heart rate and/or blood pressure monitor.

Figure 5:
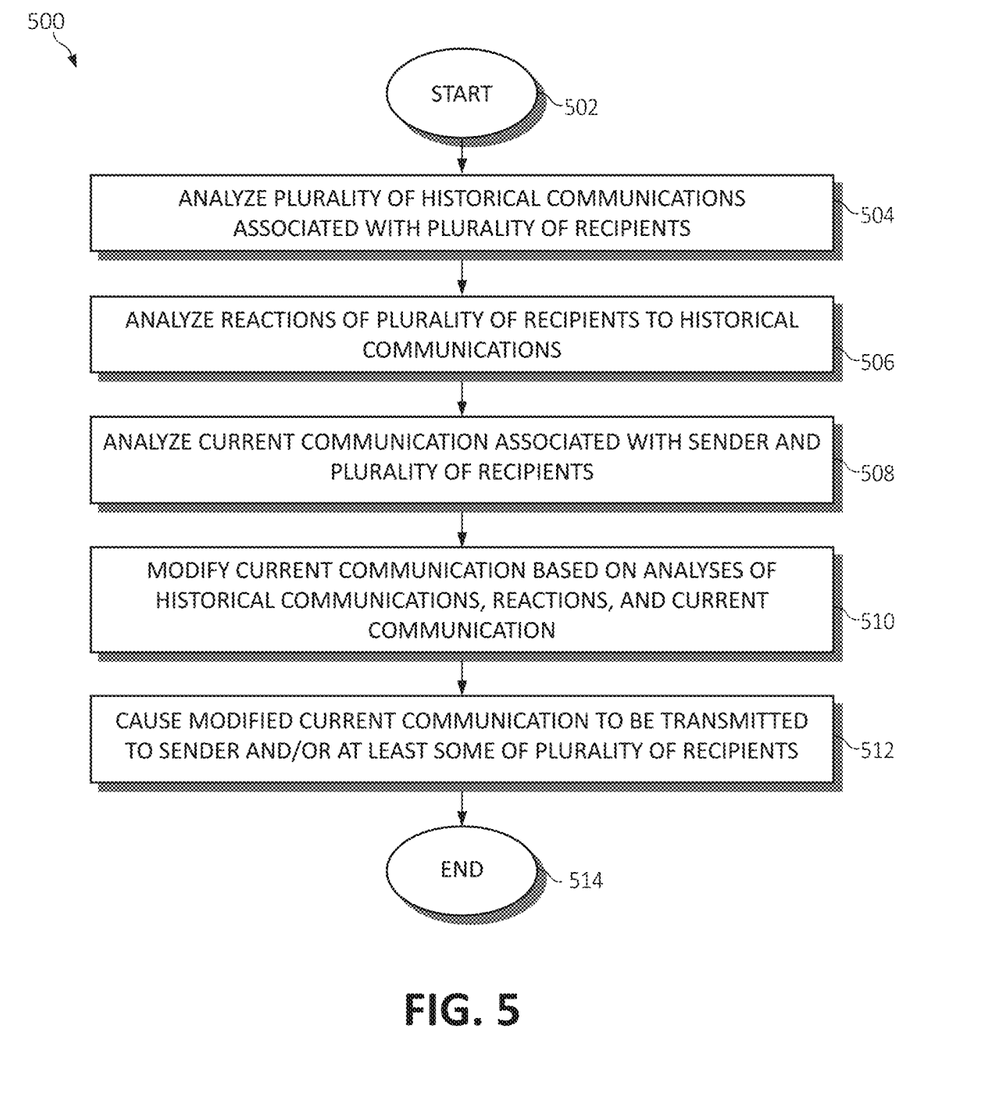
FIG. 5 is a flowchart diagram depicting an exemplary method for managing electronic communications according to an embodiment of the present invention.

Turning to FIG. 5, a flowchart diagram of an exemplary method 500 for managing electronic communications is illustrated. Method 500 begins (step 502) with, for example, multiple (previous or historical) communications (e.g., emails, text messages, etc.) being sent to (and/or received by) multiple recipients and the reactions of the recipients being monitored (and/or tracked and stored).

The plurality of historical communications are analyzed (step 504). Each of the plurality of historical communications is associated with (e.g., received by) at least one of a plurality of recipients. The analysis of the historical communications may be performed utilizing, for example, natural language processing, sentiment analysis, and/or tone analysis to extract keywords and understand the contextual meaning and type of the communications.

The reactions of the plurality of recipients to the historical communications are analyzed (step 506). The reactions of the plurality of recipients to the historical communications may include response communications (i.e., communications sent by the recipients in response to the respective historical communication) and reaction information detected by at least one sensor (e.g., changes in biometric data). The collected data may be normalized to determine a consensus of the reaction of the group of recipients as a whole. In some embodiments, the system assesses relationship proximity (or the strength of relationships) between the users (or participants or recipients) by, for example, analyzing social graphs, comment history, post history, etc. (e.g., related to social media platforms), if such information is available/accessible. The system may also assess relationship proximity by tracking participation in (or on) common online channels (e.g., discussion forums, social media groups, etc.).

A current (or new or subsequent) communication is analyzed (step 508). For example, the current communication may include a message that has been composed (or at least partially composed) by the sender via a computing node, with the recipients (or at least one recipient) being indicated as being the parties (or individuals) to whom the communication is to be sent. The first communication may include (or be), for example, an email, text message, social media post (i.e., with the recipients being users to which the post will be viewable/accessible), etc. The current communication may be analyzed utilizing the same methods (e.g., natural language processing) as the historical communication, as described above.

The current communication is modified based on the analyses of the plurality of historical communications, the reactions of the plurality of recipients, and the current communication (step 510). The modifying of the current communication may be performed utilizing a cognitive analysis. The modified current communication may include (or be) a modified version of the current communication respect to content and/or recipients. For example, the modified current communication may be generated by changing at least some of the content (e.g., words) of the current communication and/or changing the list of recipients (e.g., preventing/blocking some of the intended/original recipients from receiving the communication). However, the modified current communication may include an indication of a warning regarding transmitting the first communication to at least some of the recipients, which may be sent to only the sender (or creator) of the current communication.

The modified current communication is caused to be transmitted to at least one of the sender and at least some of the plurality of recipients (step 512). As described above, depending on the nature of the modified current communication, the modified current communication may be sent (or transmitted) to all of the intended recipients (e.g., perhaps after the content has been changed), only selected ones of the intended recipients (e.g., when the modified current communication is the same as the current communication and some of the recipients have been predicted to react negatively to the communication), and/or the sender (e.g., when the second communication includes a warning).

Methods 500 ends (step 514) with, for example, the reactions of the sender and/or the recipients to the modified current communication being monitored and/or feedback regarding the second communication being received. Such may be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instruction.

The invention claimed is:

1. A method, by one or more processors, for managing electronic communications comprising:
  analyzing a plurality of historical communications, wherein each of the plurality of historical communications is associated with at least one of a plurality of recipients;
  analyzing reactions of the plurality of recipients to each of the plurality of historical communications associated therewith, wherein said analysis of the reactions includes normalizing the reactions to determine a consensus of the reactions, wherein the normalizing of the reactions to determine a consensus of the reactions is based on a proximity of a social relationship between at least some of the plurality of recipients;
  training a machine learning model according to the analyzed reaction of the plurality of recipients, wherein vectors formed from reaction data of the reactions are added to normalizing features representing the consensus of the reactions during the normalizing;
  analyzing a current communication comprising a group message between the sender and the plurality of recipients according to an analysis of the trained machine learning model;
  modifying the current communication based on said analyses of the plurality of historical communications, the reactions of the plurality of recipients, and the current communication; and
  causing said modified current communication to be transmitted to at least one of the sender and at least some of the plurality of recipients.

2. The method of claim 1, wherein the modifying of the current communication is performed utilizing a cognitive analysis.

3. The method of claim 1, wherein the modifying of the current communication includes modifying content of the current communication.

4. The method of claim 1, wherein said modified current communication includes an indication of a warning regarding transmitting the current communication to the plurality of recipients, and wherein the causing of said modified current communication to be transmitted to at least one of the sender and at least some of the plurality of recipients includes causing said modified current communication to be transmitted to only the sender.

5. The method of claim 1, wherein said modified current communication is the same as the current communication, and wherein the causing of said modified current communication to be transmitted to at least one of the sender and at least some of the plurality of recipients includes causing said modified current communication to be transmitted to only selected ones of the plurality of recipients.

6. The method of claim 1, wherein the reactions of the plurality of recipients to each of the plurality of historical communications associated therewith include at least one of a response communication and reaction information detected by at least one sensor.

7. A system for managing electronic communications comprising:
  at least one processor that
    analyzes a plurality of historical communications, wherein each of the plurality of historical communications is associated with at least one of a plurality of recipients;
    analyzes reactions of the plurality of recipients to each of the plurality of historical communications associated therewith, wherein said analysis of the reactions includes normalizing the reactions to determine a consensus of the reactions, wherein the normalizing of the reactions to determine a consensus of the reactions is based on a proximity of a social relationship between at least some of the plurality of recipients;

trains a machine learning model according to the analyzed reaction of the plurality of recipients, wherein vectors formed from reaction data of the reactions are added to normalizing features representing the consensus of the reactions during the normalizing;

analyzes a current communication comprising a group message between the sender and the plurality of recipients according to an analysis of the trained machine learning model;

modifies the current communication based on said analyses of the plurality of historical communications, the reactions of the plurality of recipients, and the current communication; and causes said modified current communication to be transmitted to at least one of the sender and at least some of the plurality of recipients.

8. The system of claim 7, wherein the modifying of the current communication is performed utilizing a cognitive analysis.

9. The system of claim 7, wherein the modifying of the current communication includes modifying content of the current communication.

10. The system of claim 7, wherein said modified current communication includes an indication of a warning regarding transmitting the current communication to the plurality of recipients, and wherein the causing of said modified current communication to be transmitted to at least one of the sender and at least some of the plurality of recipients includes causing said modified current communication to be transmitted to only the sender.

11. The system of claim 7, wherein said modified current communication is the same as the current communication, and wherein the causing of said modified current communication to be transmitted to at least one of the sender and at least some of the plurality of recipients includes causing said modified current communication to be transmitted to only selected ones of the plurality of recipients.

12. The system of claim 7, wherein the reactions of the plurality of recipients to each of the plurality of historical communications associated therewith include at least one of a response communication and reaction information detected by at least one sensor.

13. A computer program product for managing electronic communications by one or more processors, the computer program product comprising a non-transitory computer-readable storage medium having computer-readable program code portions stored therein, the computer-readable program code portions comprising:

an executable portion that analyzes a plurality of historical communications, wherein each of the plurality of historical communications is associated with at least one of a plurality of recipients;

an executable portion that analyzes reactions of the plurality of recipients to each of the plurality of historical communications associated therewith, wherein said analysis of the reactions includes normalizing the reactions to determine a consensus of the reactions, wherein the normalizing of the reactions to determine a consensus of the reactions is based on a proximity of a social relationship between at least some of the plurality of recipients;

an executable portion that trains a machine learning model according to the analyzed reaction of the plurality of recipients, wherein vectors formed from reaction data of the reactions are added to normalizing features representing the consensus of the reactions during the normalizing;

an executable portion that analyzes a current communication comprising a group message between the sender and the plurality of recipients according to an analysis of the trained machine learning model;

an executable portion that modifies the current communication based on said analyses of the plurality of historical communications, the reactions of the plurality of recipients, and the current communication; and an executable portion that causes said modified current communication to be transmitted to at least one of the sender and at least some of the plurality of recipients.

14. The computer program of claim 13, wherein the modifying of the current communication is performed utilizing a cognitive analysis.

15. The computer program of claim 13, wherein the modifying of the current communication includes modifying content of the current communication.

16. The computer program of claim 13, wherein said modified current communication includes an indication of a warning regarding transmitting the current communication to the plurality of recipients, and wherein the causing of said modified current communication to be transmitted to at least one of the sender and at least some of the plurality of recipients includes causing said modified current communication to be transmitted to only the sender.

17. The computer program of claim 13, wherein said modified current communication is the same as the current communication, and wherein the causing of said modified current communication to be transmitted to at least one of the sender and at least some of the plurality of recipients includes causing said modified current communication to be transmitted to only selected ones of the plurality of recipients.

18. The computer program of claim 13, wherein the reactions of the plurality of recipients to each of the plurality of historical communications associated therewith include at least one of a response communication and reaction information detected by at least one sensor.

* * * * *